June 24, 1958 — T. P. FARKAS — 2,840,169
PROPELLER CONTROL SYSTEM
Filed Oct. 14, 1952
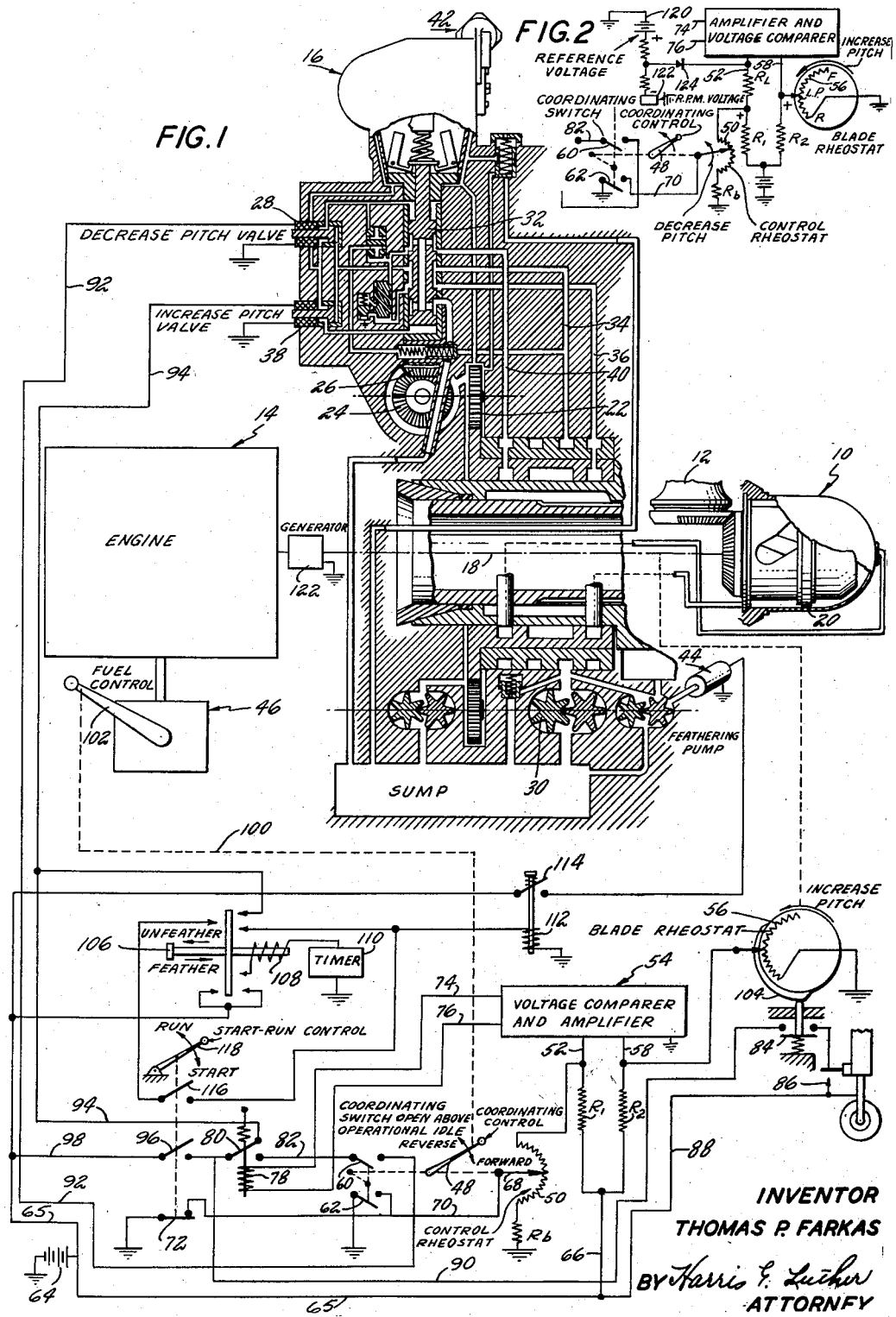
INVENTOR
THOMAS P. FARKAS
BY Harris F. Luther
ATTORNEY

United States Patent Office 2,840,169
Patented June 24, 1958

2,840,169
PROPELLER CONTROL SYSTEM

Thomas P. Farkas, Bloomfield, Conn., assignor to United Aircraft Corporation, East Hartford, Conn., a corporation of Delaware Application October 14, 1952, Serial No. 314,593

20 Claims. (Cl. 170—135.74)

This invention relates to a propeller control system and particularly to a system in which propeller blades are positioned in accordance with the position of a control lever.

An object of this invention is to simplify the propeller controls so that by movement of a single lever the propeller pitch may be manually controlled in reverse pitch and governor controlled in forward pitch and at the same time the engine power may be controlled to facilitate the thrust control of turbine driven propellers.

Another object is the provision of mechanism for converting a speed responsive control system into a thrust controlling system.

Still another object is the provision of speed limiting mechanism in a thrust controlling system to prevent operation at an unwanted speed.

Further and additional objects will be apparent from the following specification and the drawings in which:

Fig. 1 is a schematic showing of an engine driven propeller and the control system therefor.

Fig. 2 is a schematic sketch showing a speed limiting mechanism incorporated in the control of Fig. 1.

In ground handling airplanes and in hovering helicopters having both propellers and rotors, it is desirable to have a control which will in effect vary the thrust of the engine driven propeller. In turbine propellers the inertia of the rotating parts is so great that speed response is comparatively slow, hence a control which will vary the propeller pitch will provide a thrust control even when there may be little change in speed. This is particularly true of the reverse pitch position of propellers and the lower positive pitch positions. In the higher positive pitch positions the propeller may be governor controlled in the usual manner. Such an arrangement will provide a control particularly useful for handling airplanes on the ground or on the water while permitting the usual speed control while the airplane is in flight.

Basically the mechanism of this application relates to a structure which will disable the governor control at approximately 7° positive pitch and will schedule a specific relation between blade pitch and a control lever from the 7° positive pitch position through zero to the full reverse pitch position. During this entire range the propeller pitch is fixed in accordance with selected positions of a control lever which in the structure used for illustration is a throttle lever, thus giving a pitch which varies in fixed relation with throttle opening to provide an accurate control of propeller thrust. In the structure selected for illustrating the invention, a propeller shown generally at 10 having a plurality of blades one of which is shown at 12 is driven by an engine 14 which is preferably a turbine. A hydraulic governor indicated generally at 16 is driven by gears 22, 24, 26 from the propeller shaft 18 and directs fluid to one side or the other of piston 20 to control the pitch of the blades 12. This governor is provided with a decrease pitch valve 28 which is electrically controlled to direct fluid from the main pump 30 to the top of pilot valve 32 to force the pilot valve downward to direct fluid from pump 30 through channel 34 to valve 32 and thence through line 36 to the inboard side of piston 20 to decrease the propeller pitch. The governor is also provided with an increase pitch valve 38 which can direct fluid from the pump 30 to the underside of pilot valve 32, thus forcing the pilot valve upward to thereby direct fluid from pump 30 to channel 34, pilot valve 32, channel 40 to the outboard side of piston 20 to increase the propeller pitch. For further details of this propeller and governor reference may be made to application Serial No. 84,305, filed March 30, 1949, by John E. Anderson for Hub Mounted Control now Patent No. 2,653,668 and Patent No. 2,477,868 issued August 2, 1949 to G. W. Forman. This governor is provided with a control indicated generally at 42 by which the governor speeder spring may be set in the usual manner to select the speed at which the propeller will be governed. The governor is provided with a feathering pump shown generally at 44 which may be energized to supply pitch changing fluid when the propeller is stationary. This fluid may be directed by the decrease pitch valve and the increase pitch valve in the same manner as the fluid from pump 30 in order to change the propeller blade pitch. The engine 14 is provided with a fuel control shown generally at 46 which is controlled by means of a coordinating lever 48. The fuel control or the connection between the coordinating control and the fuel control is such that movement of the coordinating control in a single direction will reduce the fuel flow to a minimum and then by movement in the same direction increase the fuel flow. This type of control may be of any well known type such as mentioned in British Patent 642,957 published September 13, 1950 and shown in British Patent 631,000 accepted October 25, 1949. The controls are so arranged that the minimum fuel flow will occur at a low propeller blade angle and will increase from this minimum flow as the propeller is reversed or as the propeller is moved from the low position into a forward pitch position. For one practical installation the minimum fuel flow occurred at plus 7°.

The above-described mechanism will provide a propeller and engine combination in which the engine speed is maintained substantially constant by the governor controlled propeller in positive pitch positions and the fuel control may be varied to increase or decrease the engine power.

In order to provide for control of the propeller pitch, as distinguished from control of the propeller speed, particularly in the lower pitch positions and in reverse, a control rheostat 50 is mounted for movement with the coordinating control and schematically shown as mounted on the same shaft. Control rheostat 50 may vary the voltage in line 52 connected to an amplifier and voltage comparer shown generally at 54. A blade rheostat shown generally at 56 is connected with the propeller shaft 18 to be driven thereby and thus positioned in accordance with the blade pitch. The blade rheostat controls the voltage in line 58 connected to amplifier and voltage comparer 54. As will be explained hereinafter, the voltages in lines 52 and 58 are compared and the resulting voltage is utilized to effect actuation of the increase and decrease pitch valves of the governor 16 to thereby disable governor action and control the propeller blade pitch so that it will correspond to the position of the coordinating control lever.

Also operatively connected with the coordinating control lever 48 are switches 60 and 62 which are so connected to the control rheostat and the coordinating lever 48 that the switches will remain open in all positions of the coordinating control above the 7° blade angle and the corresponding throttle position which may be identified as the operational idle position but will be closed in all positions of the control lever from the 7° position to full reverse. When this switch 60 is open the connection between the power source 64 and the decrease pitch valve is broken. Under this condition if switches 84 and 86, to be later described, are closed, the pitch may be increased by the action of the increase pitch valve but may be decreased only by governor action. If switch 84 or 86 is open, control in both directions is by the governor 16. When switches 60, 62, 84 and 86 are all closed the governor is disabled and control taken over by control lever 48 and its associated mechanism. Power source 64 supplies power for operating the increase and decrease pitch solenoids, the feathering pump, various holding coils and relays to be described and also supplies the source of voltage which is modified by the blade and control rheostats and then compared to give the control voltage which is eventually utilized to position the propeller blade in accordance with the control lever position.

Power source 64 which may be the airplane electrical system of 28 volts or any other suitable source of electricity is connected to line 66. The parallel resistances $R^1$ and $R^2$ with lines 52 and 58 in turn are connected to the amplifier and voltage comparer. The voltage in line 58 is varied by means of the blade rheostat 56 between a substantial portion of the voltage of the source 64 and zero or ground voltage as the blade rheostat is turned with the propeller blades as they change pitch. Line 52 is connected with control rheostat 50, the opposite end of which is connected with ground through resistances $R_b$. The slider 68 of rheostat 50 is connected to line 70 which may be grounded through switch 62 or switch 72. When either switch 62 or 72 is closed, the voltage in line 52 may be varied from a substantial portion of the voltage of the source 64 to substantially zero or ground voltage. If both switches 62 and 72 are open arm 68 is ungrounded and the voltage drop is across the entire rheostat 50 and the resistance $R_b$, which will give a voltage in line 52 which is somewhat higher than the highest voltage obtainable by movement of the slider 68. This higher voltage is utilized for a purpose which will be described later. Voltages occurring in lines 52 and 58 are led to an amplifier and voltage comparer 54 of any standard and well known form. The output of the amplifier and voltage comparer is fed through lines 74 and 76 to a relay 78. When the voltages in lines 52 and 58 are equal or when the voltage in line 52 is greater than the voltage in line 58 then no signal is sent to the relay 78 and the switch 80 remains in the position shown in Fig. 1. If, however, the voltage in line 58 is greater than the voltage in line 52 a signal is sent to relay 78 which will energize the relay and actuate switch 80 making a connection to line 82. If at this time switch 60 is closed and safety switches 84 and 86 (or switch 96), to be described later, are also closed a signal will be sent from power source 64 to lines 65, 88, switches 86 and 84, line 90 or through line 98 and switch 96 to switch 80, line 82, switch 60 and line 92 to the decrease pitch solenoid which actuates decrease pitch valve 28. This will disable the governor and start to decrease the propeller pitch. Decreasing the propeller pitch will move the blade rheostat 56 clockwise as shown in Fig. 1 to thereby reduce the voltage in line 58 and tend to establish equilibrium between the voltages 52 and 58. When the equilibrium point is reached relay 78 is de-energized and switch 80 then connects with line 94. If at this time switch 96, which will be described later, is closed or switches 84 and 86 are closed, energy will be supplied from power source 64 to line 65 and line 98 and switch 96 to switch 80 or from source 64 to line 65, line 88, switches 86 and 84, line 90 to switch 80 and thence to line 94 to energize the increase pitch solenoid which actuates pitch increase valve 38 to again disable the governor and increase the propeller blade pitch. The increase in the propeller blade pitch will move blade rheostat in a counterclockwise direction which will again increase the voltage in line 58 and start the cycle all over again. Hence whenever the voltage in line 58 differs from the voltage in line 52 and the necessary switches are closed, the propeller blades will cycle alternately increasing and decreasing their pitch about a selected point at which the voltages in 52 and 58 are equal.

It will thus be apparent that as the slider 68 of control rheostat 50 is moved to vary the voltage in line 52, the blade pitch will be changed so as to bring the voltage in line 58 to a substantially equal value. This will cause the blades to assume a pitch corresponding to the position of the control rheostat slider. By this mechanism, therefore, the blade pitch may be selected simply by positioning the coordinating control lever 48 to which the control rheostat slider 68 is secured for rotation therewith. From the description thus far, it will be apparent that although the propeller is governor controlled to maintain a substantially constant speed when the coordinating control is above some selected position such as operation idle, when the coordinating control is below the operation idle position so as to close switches 60 and 62, then the governor is disabled and the propeller pitch is controlled solely by the position of the lever 48.

As described above, lever 48 is connected with fuel control 46 schematically shown by the dotted line connection 100 connecting the lever 48 with the fuel control lever 102. This fuel control is arranged so that as the coordinating control lever is moved in one direction to reduce the throttle opening from full throttle toward an idle position, the control rheostat slider 68 will be moved in a counterclockwise direction. A detent is usually provided at the operational or ground idle position of the coordinating control lever to prevent movement beyond that point without some additional action by the pilot. Movement of the coordinating control in the same direction beyond the detent will cause a further small closing of the throttle but further continued movement will cause the throttle to again open. It will be noted that the movement of the coordinating control lever in the direction just described will move the slider arm 68 of control rheostat in a direction to reduce the blade pitch (i. e. less positive or more negative) after the switches 60 and 62 are closed. The blade pitch position and the coordinating control lever are so related that the continued movement of the lever in the direction just described will reduce the propeller pitch through zero into reverse pitch and will continue to follow the position of the control lever to the full reverse pitch position.

In this application movement of the blades from feathered position down through zero and to full reverse pitch position is called pitch reduction whether it takes place in the positive pitch or the negative pitch range. It will thus be apparent that a pitch reduction in the positive pitch range means a less positive pitch while a pitch reduction in the negative pitch range means a more negative pitch. The term increase pitch is used in a similar manner and refers to a change from full reverse toward full feather whether it occurs in the reverse or the positive pitch region. As the pitch control by the coordinating control lever 48 and the control rheostat 50, 68 is now intended primarily for use in the ground handling of airplanes, safety switches 84 and 86 are incorporated in the power supply line for the switch 80 so that neither the increase or the decrease pitch solenoids and their valves can normally be actuated in flight. Switch 84 is opened by a cam 104 operatively connected to the propeller blades so that whenever the blades are in a forward pitch position above a predetermined amount, say 8° (or slightly higher than 7°) the switch will be opened. This angle will preferably be chosen so that it is above the angle at which the usual low pitch stops (see Patent No. 2,477,868), become effective so that switch 84 will be closed before further decrease pitch movement of the propeller blades is prevented by the stops. Actuation of the decrease pitch solenoids will, in the usual manner, see application 84,305, provide the increase in pressure necessary to remove the steps. In addition to switch 84, and in series therewith, is a switch 86 which is actuated responsive to flight support of the airplane. The switch 86 may be attached to a ground contacting member such as a landing gear, or a pressure responsive element on a boat, and will be opened whenever the airplane and turbine are flight supported, as when the airplane is in flight or airborne, but will be closed when the airplane is resting on either the land or water. It is apparent that the opening of either of these switches will prevent energization of either the increase or decrease pitch solenoids.

In addition to the features enumerated above, the propeller is provided with the usual feathering mechanism comprising a switch 106 which, when pushed, will energize a holding coil 108 in series with a timer 110 which will hold the switch closed for a predetermined length of time and then de-energize the coil 108 and open the switch 106. Closing switch 106 will also energize coil 112, closing switch 114 and energizing feathering pump 44 supplying additional fluid to assist in feathering the propeller particularly as it slows down. Closing the switch 106 will also energize the increase pitch solenoid and actuate the increase pitch valve so as to disable the governor to direct fluid to the increase pitch side of piston 20. At the expiration of the time determined by the timer 110 switch 106 opens, de-energizing coil 112, opening switch 114 and stopping the feathering pump and also de-energizing the increase pitch solenoid and returning the propeller to governor control. However, when the propeller is feathered, the engine and governor are stopped and hence the propeller remains stationary.

To unfeather the propeller it is necessary to first close switch 116 so that pulling of switch 106 will energize coil 112, closing switch 114 and starting the feathering pump 44 to supply fluid to the non-rotating propeller. The propeller governor being stationary, the flyweights will be in the position shown in Fig. 1 and any fluid directed to the pilot valve through passage 34 will be directed to the passage 36 and hence to the unfeathering or pitch reducing side of the piston 20.

Lever 118 which is marked the "start-run control," when placed in the start or down position, closes switches 116 and 96 and opens switch 72. Closing switch 116 will, as indicated above, complete the circuit for the feathering pump. Closing switch 96 will supply energy to the switch 80, as previously described, and opening switch 72 will remove the ground from the control rheostat wiper 68 leaving resistance 50 grounded through resistance $R_b$ to provide a higher positive voltage in line 52 than can be supplied by the rheostat alone. For unfeathering, the coordinating control 48 is placed in a position slightly above the operational idle so as to assure opening of switches 60 and 62. With the start-run control 118 in the down position and with the coordinating control just above operational idle, the unfeather switch 106 is pulled to start the feathering motor. The governor being stationary and therefore in an underspeed condition will direct fluid to the piston 20 to reduce the propeller pitch. The blade rheostat is effective throughout the entire range of blade pitch from feather to full reverse so that, when feathered, the entire rheostat resistance is in the circuit and produces the maximum positive voltage in line 58. The control rheostat having no ground connection through the wiper 68, the positive voltage in line 52 will be the voltage equivalent to some selected propeller pitch, say 50°, the control rheostat alone being capable of providing a voltage equivalent only to a small lower pitch such as 7°. The positive voltage in line 58 being that equivalent to full feather or 90° and that in line 52 being equivalent to the voltage at, say 50°, relay 78 will be energized to close switch 80 onto line 82; but as switch 60 is open due to the coordinating control being positioned above operational idle, the decrease pitch valve will not be energized. As pointed out above, the fluid will be directed by the position of the governor valve due to underspeed condition.

When the propeller reduces its pitch so that the voltage in line 58 equals the voltage in line 52, that is when the blade reaches some position such as 50°, coil 78 will be de-energized and switch 80 placed in contact with line 94. Switch 96 being closed by the start-run control, energy will now be supplied to the increase pitch solenoid so as to operate the increase pitch valve, disable the governor and start the propeller towards increase pitch. An increase in pitch will increase the voltage across the blade rheostat and hence in line 58 to again energize coil 78 and move switch 80 into contact with line 82, thus throwing the control back to the governor. The propeller will thus cycle around the selected pitch until the run-start switch is moved into run position where the governor will take over the entire control. It should be noted in passing that unfeathering in flight will automatically cause rotation of the propeller and its engine so that the engine may be started by the windmilling action.

As indicated above, the inertia of a turbine is so great that its speed response to throttle opening is much slower than the pitch changing rate of the propeller. Upon sudden movement of the coordinating control to a reverse pitch position, it would be quite possible for the propeller to assume the reverse pitch position well before the turbine could increase its speed sufficiently to develop the power required to operate the propeller at the selected reverse pitch. This might cause a stall of the turbine engine. In order to prevent such a condition, an auxiliary source of voltage dependent upon speed can be connected through a rectifier or voltage limiting means with the line 52 so as to schedule the speed and blade angle or, if desired, provide for constant speeding in reverse at a preselected or adjustable speed. As shown in Fig. 2 which is the same structure as that shown in Fig. 1 with means for providing an additional voltage source at line 52 added, the additional source of voltage may be provided by a reference voltage 120 connected to buck a voltage proportional to speed which may be produced by a generator 122. The resultant of these bucking voltages is led through a rectifier 124 to the line 52. A high resistance $R_L$ is connected into the line 52 between the rectifier 124 and the control rheostat 50 to isolate the coordinating rheostat from the resultant of the bucking voltage when the rectifier 124 is conducting. As shown, rectifier 124 will conduct only when the resultant of the bucking voltages is more positive than the voltage across the control rheostat.

It will thus be apparent that if the coordinating control is moved well into the reverse control position, the positive voltage across the rheostat will be very low and the propeller will attempt to assume a reverse pitch position. If the speed of the turbine is low, generator 122 will develop only a small amount of voltage to buck the reference voltage 120 so that the reference voltage which is a positive voltage will predominate causing rectifier 124 to conduct and impress a positive voltage on line 52 and thus prevent the propeller pitch from decreasing (i. e. increasing negative pitch) to a point where the turbine could not maintain speed. As the turbine gathers speed the negative voltage of the generator 122 will increase cutting down the effective positive voltage of the reference 120 and allowing the blade pitch to reduce. It is thus obvious that the pitch and the speed may be scheduled. It will be possible by choosing the proper components for the reference voltage and the voltage responsive to speed and the blade rheostat voltage to provide for an equilibrium point in the reverse pitch range at which the reference and the R. P. M. voltages will govern at a substantially constant speed irrespective of the position of the coordinating control over a limited range.

From the above description it will be apparent that I have provided a control by which a propeller may be feathered or unfeathered in flight and may be controlled at constant speed in flight. In unfeathering the propeller may be made to cycle about any preselected pitch position until it is desired to turn the propeller over to governor control. In addition I have provided a control by which the propeller may be reversed and in reversing will disable the governor and position the propeller at any desired pitch setting from approximately plus 7° to the full reverse pitch position. I have additionally provided means by which the propeller may be positioned in accordance with speed in the reverse pitch range either for preventing stall while being reversed or for running the engine at a constant speed in reverse at different throttle settings.

Although only one embodiment has been shown and described herein, it will be apparent that various changes and modifications may be made in the construction and arrangement of the various parts without departing from the scope of this novel concept.

What it is desired to obtain by Letters Patent is:

1. A propeller control for a propeller having adjustable pitch blades and having a governing range and a reverse pitch range and pitch changing means for moving the blades through said ranges comprising in combination a speed governor for automatically controlling the propeller speed by the blade pitch in the governing range, pitch increasing means connected with said governor for disabling said governor and increasing the propeller pitch and pitch decreasing means connected with said governor and decreasing the propeller pitch, means for controlling the propeller in reverse pitch including a first signal producing means and means connected with said blades for varying said signal in accordance with the position of said blades, manually actuated pitch selecting means, a second signal producing means and means connected with the pitch selecting means for varying said second signal in accordance with the position of said pitch selecting means, means for comparing the two signals and producing a resulting signal, means responsive to the resulting signal for selectively operating said pitch increasing or pitch decreasing means, to change the blade signal and make the other signal predominate, whereby the blade pitch will continuously cycle about a pitch selected by said pitch selecting means.

2. In a propeller control for a propeller having adjustable pitch blades and a constant speed range and a reverse pitch range and means for moving said blades through said constant speed range and said reverse pitch range, a speed governor controlling the pitch of said blades in the constant speed range, pitch increasing means connected with said governor for disabling said governor control and actuating said blade moving means for increasing the propeller pitch and pitch decreasing means connected with said governor for disabling said governor control and actuating said blade moving means for decreasing the propeller pitch, means for controlling the propeller in reverse pitch comprising manually actuated signal varying means, blade actuated signal varying means, means connected with both signal varying means for comparing the two signals and producing a signal corresponding to the predominant one of the two compared signals, means connected with the output of said comparing means for actuating said pitch increasing or said pitch decreasing means in accordance with the output of said comparing means.

3. Control means for an hydraulically actuated controllable pitch propeller having adjustable pitch blades, hydraulically actuated pitch changing mechanism, a governor having a pilot valve controlling the flow of hydraulic fluid to and from said pitch changing mechanism, and pitch increase and pitch decrease valves for disabling the governor by directing fluid to move said pilot valve to one extreme position or the other to thereby direct fluid to said pitch changing mechanism and move said blade toward increase or decrease pitch position, comprising in combination, a source of electrical energy, a rheostat operatively connected with said blades for movement therewith and connected with said source for providing an electrical signal variable with the blade position, pitch control means, a rheostat operatively connected with said pitch control means for movement therewith and connected with said source for providing an electrical signal variable with the position of said control means, signal comparing means connected with both of said rheostats for receiving and comparing said signals and providing an output signal dependent upon which of the compared signals is the greater, switching means connected with the output of said comparing means and operable by said output signal, means including said switching means operatively connecting said energy source and said pitch increase and pitch decrease valves for selectively operating said valves in accordance with said switch position.

4. Control means for an engine driven propeller having adjustable pitch blades and pitch changing means comprising in combination, a speed governor connected with the pitch changing means for changing the blade pitch to control engine speed, means for disabling said governor and increasing the blade pitch and means for disabling said governor and decreasing the blade pitch, a manually actuated engine fuel control, means independent of said fuel control for selecting the governor speed setting, a first signal producing means and means connected with said blades for varying said signal in accordance with the position of the blades, a second signal producing means and means connected with said control for varying said second signal in accordance with the position of said engine control, means for comparing the two signals, means connecting said comparing means with said pitch increasing and pitch decreasing means including means responsive to the predominating signal of the compared signals for selectively operating said pitch increasing or pitch decreasing means, disabling said governor and changing the blade pitch to change the blade signal and make the other signal predominant whereby the blade pitch will cycle about a pitch selected by the engine control means.

5. Control means as claimed in claim 4 having means actuated by said engine control for controlling said connecting means and including a switch in said connecting means for disabling at least a portion of said connecting means when the engine control is above a selected position.

6. Control means as claimed in claim 4 including a source of power for said pitch increasing and pitch decreasing means and a blade actuated switch connecting said source and said last mentioned means.

7. In combination, an engine control adapted to vary fuel flow to an engine, a propeller control for a propeller, driven by said engine, and having a feathering range, a governing range and a reverse pitch range, said propeller control comprising a governor for controlling the blade pitch in the governing range and an increase pitch valve and a decrease pitch valve for controlling the blade pitch in the feathering and reverse ranges, means for controlling said valves in the reverse range comprising means providing a voltage varying in accordance with engine control position, means providing a voltage varying in accordance with blade position, means comparing said voltages and providing a resultant voltage, means actuated by said resultant voltage to selectively actuate said valves and position said blades in accordance with said control position, means automatically substituting a voltage responsive to speed for said engine control position voltage to limit pitch reduction in reverse under selected speed conditions, means responsive to blade positions above a selected blade pitch in the lower portion of the governing range disabling said valve actuating means, means controlling said valves in unfeathering comprising means energizing said valve actuating means, means substituting a fixed voltage for said engine control position voltage and means for disabling said decrease pitch valve so that fluid supplied to said governor with the propeller feathered will unfeather the propeller until said resultant voltage from said comparing means actuates said increase pitch valve.

8. A control as claimed in claim 4 in which the propeller has a forward pitch range and a reverse pitch range and the engine control has an operational idle position and the pitch increasing and pitch decreasing means are electrically controlled, a switch connected with the decrease pitch control and a switch forming a part of the second signal producing means and means connecting said manual engine control with said switches for opening said switches when the manual control passes the operational idle position in the increasing fuel and pitch direction to thereby disable propeller pitch control by said manual engine control.

9. A control for an adjustable pitch propeller comprising, in combination, a governor operatively connected with said propeller for changing its pitch in accordance with speed, means for unfeathering said propeller in flight to a preselected pitch position including a source of power and means connecting said source of power with said governor, said governor directing said power to reduce the propeller pitch, electrically actuated means for disabling the governor and increasing the propeller pitch, means for establishing a fixed reference voltage, a source of voltage, voltage varying means connected with said source and actuated by movement of said blades for varying voltage from said source in accordance with blade position, means for comparing said reference voltage with said variable voltage and creating an output signal in accordance with the relative values of said compared voltages, switch means actuated by the output of said voltage comparing means for energizing said governor disabling and pitch increasing means when the propeller blades pass a predetermined pitch position in the pitch reducing direction and for restoring control to said governor when the blades pass said position in the pitch increasing direction.

10. A device as claimed in claim 9 in which the propeller pitch is adjusted by hydraulically actuated means and the governor has a pilot valve which controls the flow of hydraulic fluid to and from said propeller and the means for disabling the governor includes an electrically actuated valve for directing fluid to move the governor pilot valve to an extreme position.

11. In combination, an engine control adapted to vary the fuel flow to an engine and having an operational idle position, a propeller control for a propeller having a governing range and a reverse pitch range, said propeller control for the reverse pitch range comprising an increase pitch valve, and a decrease pitch valve, a voltage source, voltage varying means operatively connected with said source and said engine control to provide a voltage varying in accordance with said engine control position, voltage varying means operatively connected with said voltage source and the propeller blades to provide a voltage varying in accordance with the propeller blade position, means for comparing the voltages provided by said voltage varying means, means responsive to a preponderance of one voltage over the other for selectively energizing either the increase pitch valve or the decrease pitch valve to change the blade pitch and eliminate the voltage difference and position the blades in accordance with engine control position, and means actuated by said engine control disabling said voltage responsive means when said engine control is above operational idle position.

12. A propeller control, for a propeller having adjustable pitch blades and means for moving said blades to increase and decrease their pitch, comprising means connected with said blades for producing a signal proportional to the pitch position of said blades, manually actuated pitch control mechanism, means connected with said control mechanism for producing a signal proportional to the position of said control mechanism, signal comparing means connected with both said signal producing means, for providing a resultant signal dependent upon the preponderance of one of said proportional signals over the other, control means for said blade moving means, a source of electrical power, means controlled by said resultant signal selectively directing said power to said control means for increasing or decreasing the blade pitch, a blade actuated switch located between said source of power and said control means to disable control of said blade moving control means by said resultant signal when the blades are above a preselected pitch position.

13. A propeller control for a propeller having adjustable pitch blades and having a governing range and a reverse pitch range and pitch changing means for moving the blades through said ranges comprising in combination, a governor for controlling the blade pitch in the governing range, pitch increasing means connected with said governor for disabling said governor and increasing the propeller pitch, and pitch decreasing means connected with said governor and decreasing the propeller pitch, means for controlling the propeller in reverse pitch including a source of voltage and a rheostat operably connected with said blades for varying the voltage to produce a first signal varying in accordance with blade position, manually actuated pitch selecting means, a rheostat connected with the pitch selecting means and said source for varying the voltage to produce a second signal varying in accordance with the position of the pitch selecting means, means for comparing the two signals and producing a resultant signal, means responsive to the resulting signal for selectively operating said pitch increasing and said pitch decreasing means to change the blade signal and make the other signal predominate.

14. A propeller control for a propeller having adjustable pitch blades and having a governing range and a reverse pitch range and pitch changing means for moving the blades through said ranges comprising in combination a governor for controlling the blade pitch in the poverning range, pitch increasing means including electricaly actuated mechanism connected with said governor for disabling said governor and increasing the propeller pitch and pitch decreasing means including electrically actuated mechanism connected with said governor and decreasing the propeller pitch, means for controlling the propeller in reverse pitch including a first signal producing means, and means connected with said blades for varying said signal in accordance with the position of said blades, manually actuated pitch selecting means, a second signal producing means and means connected with the pitch selecting means for varying said second signal in accordance with the position of said pitch selecting means, means for comparing the two signals and producing a resultant signal, means responsive to the resultant signal for selectively operating said pitch increasing or pitch decreasing means, to change the blade signal and make the other signal predominate, a switch forming a part of the circuit for said electrically actuated mechanisms, means moveable in response to movement of the blades into the governing range from the reverse pitch range and means connecting said switch with said last mentioned means for opening said switch and disabling control by said pitch selecting means.

15. A propeller control for a propeller having adjustable pitch blades and having a governing range and a reverse pitch range and pitch changing means for moving the blades through said ranges comprising in combination a speed governor for automatically controlling the propeller speed by controlling the blade pitch in the governing range, pitch increasing means connected with said governor for disabling said governor and increasing the propeller pitch and pitch decreasing means connected with said governor and decreasing the propeller pitch, means for controlling the propeller in reverse pitch including a first signal producing means and means connected with said blades for varying said signal in accordance with the position of said blades, manually actuated pitch selecting means, a second signal producing means and means connected with pitch selecting means for varying said second signal in accordance with the position of said pitch selecting means, means for comparing the two signals and producing a resultant signal means responsive to the resulting signal for selectively operating said pitch increasing or pitch decreasing means to change the blade signal and make the other signal predominate, means producing a signal varying with speed, signal limiting means connecting said speed signal with said pitch selecting signal to modify control of the angle by said pitch selecting means.

16. A propeller control for a propeller having adjustable pitch blades and having a governing range and a reverse pitch range and pitch changing means for moving the blades through said ranges comprising in combination a speed governor for automatically controlling the propeller speed by controlling the blade pitch in the governing range, pitch increasing means connected with said governor for disabling said governor and increasing the propeller pitch and pitch decreasing means connected with said governor and decreasing the propeller pitch, means for controlling the propeller in reverse pitch including a first signal producing means and means connected with said blades for varying said signal in accordance with the position of said blades, maually actuated pitch selecting means, a second signal producing means and means connected with the pitch selecting means for varying said second signal in accordance with the position of said pitch selecting means, means for comparing the two signals and producing a resultant signal means responsive to the resulting signal for selectively operating said pitch increasing or pitch decreasing means, to change the blade signal and make the other signal predominate, means providing a speed responsive signal, and a voltage limiting means connected with said last mentioned means and said signal comparing means and with the output of said second signal producing means so as to conduct and substitute said speed responsive signal for said second signal when said speed responsive signal is greater than the signal from said second signal producing means and block said speed responsive signal when it is less than said second signal.

17. Means for controlling a turbine driven propeller having propeller blades comprising, a manually actuated turbine fuel control, a separate propeller pitch control means including means responsive to a turbine operating parameter, propeller blade positioning means, including means responsive to blade position and comparing the position of said blade with the position of said fuel control and means operatively connected with said comparing means and selectively actuating said separate pitch control means to move said blade to a position corresponding to the position of said fuel control, one portion of said comparing means being operable by said turbine fuel control to select the propeller blade pitch, means independent of said comparing means and operable by said turbine fuel control for disabling said blade positioning means as said turbine fuel control passes a preselected position and means, independent of said comparing means, operable by a propeller blade for disabling said positioning means above a preselected blade position.

18. Means for controlling in reverse pitch an engine driven aircraft supported controllable pitch propeller having propeller blades comprising a manually actuated engine control having a forward position and having a reverse position controlling the engine fuel when the propeller is in reverse pitch, a separate pitch control means including means responsive to an engine operating parameter, and propeller blade positioning means actuated by said engine control for positioning said blades in reverse pitch when the engine control is in reverse pitch, said positioning means including means comparing the position of said blade with the position of said engine control and means, connected with said comparing means, selectively biasing said pitch control means to move said blade to a position corresponding to the position of said engine control means, independent of said comparing means, for disabling said blade positioning means responsive to flight support of said aircraft and means independent of said comparing means for disabling said blade positioning means as the engine control is moved past a predetermined position toward forward position means independent of said comparing means for disabling said blade positioning means as the propeller blade is moved past a predetermined pitch position toward a positive pitch position.

19. A control for a propeller having adjustable pitch blades and having a govering range and a feathered position, comprising in combination, a speed governor, including power directing means, operatively connected with said propeller for changing its pitch in the governing and unfeathering range in accordance with changes in speed, means connected to said power directing means for disabling said governor and positioning said power directing means independent of speed and increasing the propeller pitch, including means for feathering said propeller, means for unfeathering said propeller including a source of power independent of propeller rotation and means connecting said source of power with said power directing means for directing said power to reduce the propeller pitch while under governor control and means connected with said propeller blade for activating said positioning means to increase the propeller pitch when the propeller blade passes, in a pitch reducing direction, a predetermined pitch position in the governing range to prevent movement beyond said predetermined position.

20. A control for an adjustable pitch propeller comprising, in combination, a speed governor, including power directing means responsive to speed during unfeathering operatively connected with said propeller for changing its pitch in accordance with changes in speed during unfeathering, means for unfeathering said propeller including a source of power independent of propeller rotation and means connecting said source of power with said power directing means for directing said power to reduce the propeller pitch while under governor control, electrically actuated means connected to said power directing means for disabling said governor and increasing the propeller pitch by positioning said power directing means independent of speed, electrical means connected with said propeller blade for actuating said positioning means and increasing the propeller pitch, said electrical means including means actuated responsive to movement of the propeller blade past a predetermined position in its pitch reducing movement for energizing said electrically actuated means and responsive to movement past said position in a pitch increasing direction to restore speed responsive control to said power directing means.

References Cited in the file of this patent

UNITED STATES PATENTS

| | | |
|---|---|---|
| 2,155,586 | Ebert | Apr. 25, 1939 |
| 2,402,065 | Martin | June 11, 1946 |
| 2,410,659 | Hoover | Nov. 5, 1946 |
| 2,513,660 | Martin et al. | July 4, 1950 |
| 2,517,150 | Webb | Aug. 1, 1950 |
| 2,600,017 | Morris et al. | June 10, 1952 |
| 2,612,225 | Sparrow | Sept. 30, 1952 |
| 2,632,516 | Longfellow | Mar. 24, 1953 |
| 2,635,699 | Richmond et al. | Apr. 21, 1953 |
| 2,640,550 | Knapp et al. | June 2, 1953 |
| 2,643,077 | Martin et al. | June 23, 1953 |
| 2,653,668 | Anderson | Sept. 29, 1953 |
| 2,737,252 | Knapp et al. | Mar. 6, 1956 |

FOREIGN PATENTS

| | | |
|---|---|---|
| 642,957 | Great Britain | Sept. 13, 1950 |